HERBERT R. UHTENWOLDT
INVENTOR.

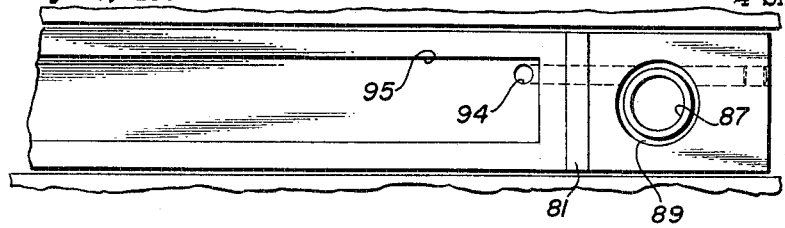
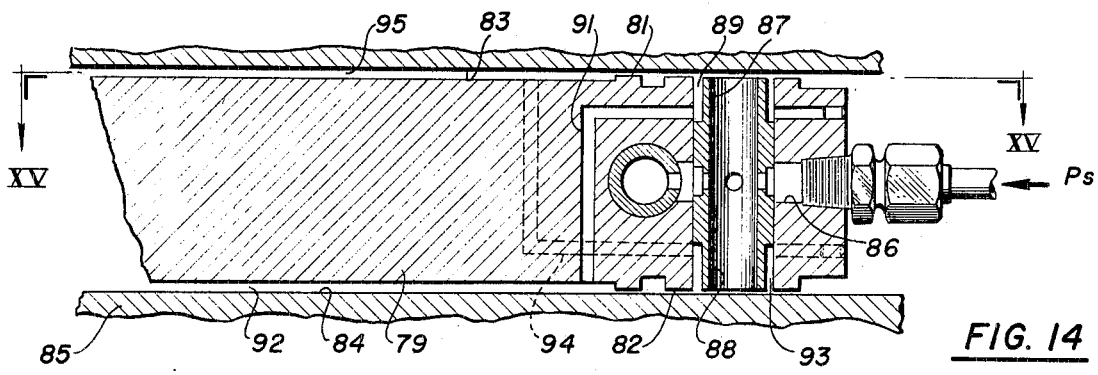
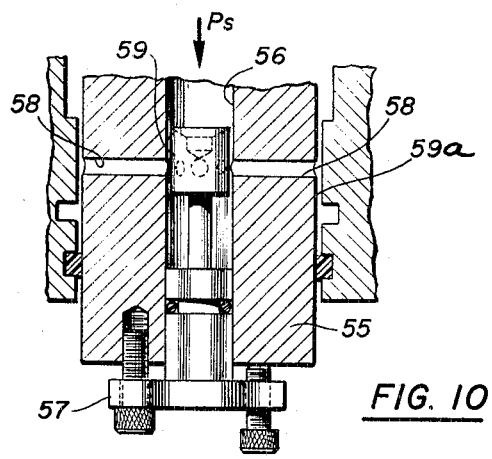
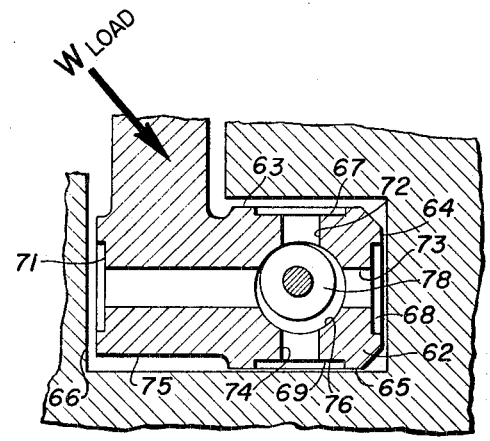
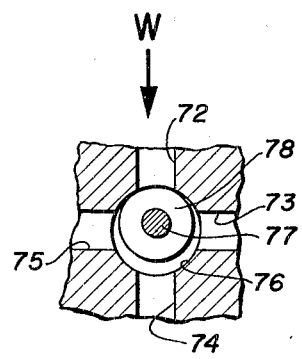
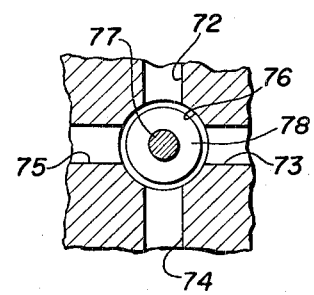

United States Patent Office

3,512,848
Patented May 19, 1970

---

3,512,848
MACHINE BEARING
Herbert R. Uhtenwoldt, Worcester, Mass., assignor to The Heald Machine Company, Worcester, Mass., a corporation of Delaware
Filed May 16, 1968, Ser. No. 729,690
Int. Cl. F16c 1/24, 33/10
U.S. Cl. 308—5
2 Claims

ABSTRACT OF THE DISCLOSURE

This invention relates to a machine bearing and, more particularly, to a machine construction having hydrostatic ways.

Background of the invention

In the design of machine tools and the like, it is common practice to use hydrostatic bearings between the relatively movable elements. Such bearings have the advantage of no moving parts and low friction. However, they have had the disadvantage that, when the load on the bearing changes, the distance between the bearing surfaces changes. In a machine tool, this can mean a substantial change in the geometric relationship between the tool and the workpiece and, therefore, an inaccuracy in the finished surface. Attempts in the past to correct this deficiency in hydrostatic bearings have been complicated and expensive and have been unstable and have been slow in response to load changes. These and other difficulties experienced with the prior art devices have been obviated in a novel manner by the present invention.

It is, therefore, an outstanding object of the invention to provide a machine bearing having a high spring constant.

Another object of this invention is the provision of a machine bearing of the hydrostatic type, wherein a change in load results in relatively little change in the distance between the surfaces.

A further object of the present invention is the provision of a machine bearing having a self-compensating hydrostatic system.

It is another object of the instant invention to provide a machine bearing of the hydrostatic type, wherein the construction is simple and inexpensive and which is capable of a long life of useful service with a minimum of maintenance.

A still further object of the invention is the provision of a hydrostatic bearing system whose operation is extremely stable and, yet, responds quickly to correct for changes in load.

It is a further object of the invention to provide a hydrostatic bearing system in which a standard design of adjustable restrictor can be used where different numbers of pockets are served from a main passage.

Another object of the invention is to provide a hydrostatic bearing system in which the necessary accuracy of manufacture is reduced; in a conventional fixed resistor hydrostatic bearing the stiffness ($k=1.5$ w./h.) is proportional to the bearing preload in inversely proportional to the clearance; with the present invention the clearance, $h_B$, can be made five times as large and still provide greater stiffness than a conventional hydrostatic bearing.

A still further object of the invention is the provision of a hydrostatic bearing system, including a load-sensitive variable restrictor which is simple to manufacture and is an integral part of the system, so that the distance between the pockets and the restrictor is small and the fluid volume effected is small, thus shortening response time and increasing the stability of operation.

With these and other objects in view, as will be apparent to those skilled in the art, the invention resides in the combination of parts set forth in the specification and covered by the claims appended hereto.

Summary of the invention

In general, the invention consists of a machine bearing having a first element with a pair of oppositely-directed surfaces, having a second element with a surface lying parallel to and slightly spaced from each of the said pair of surfaces to define a gap associated with each of the said pair of surfaces, having a passage opening into each gap, and having means for regulating the flow of pressure fluid to each passage to maintain the thickness of the two gaps at a predetermined value.

Brief description of the drawings

The character of the invention, however, may be best understood by reference to one of its structural forms, as illustrated by the accompanying drawings, in which:

FIG. 10 is a sectional view taken on the line X—X of FIG. 9, FIG. 11 is a sectional view of a further modification of the bearing, FIGS. 12 and 13 show other external loading conditions of the bearing shown in FIG. 11, FIG. 14 is a vertical sectional view of another modification of the bearing, and FIG. 15 is a view of the bearing taken on the line XV—XV of FIG. 14.

DESCRIPTION OF THE PREFERRED EMBODIMENT

Figure 1:
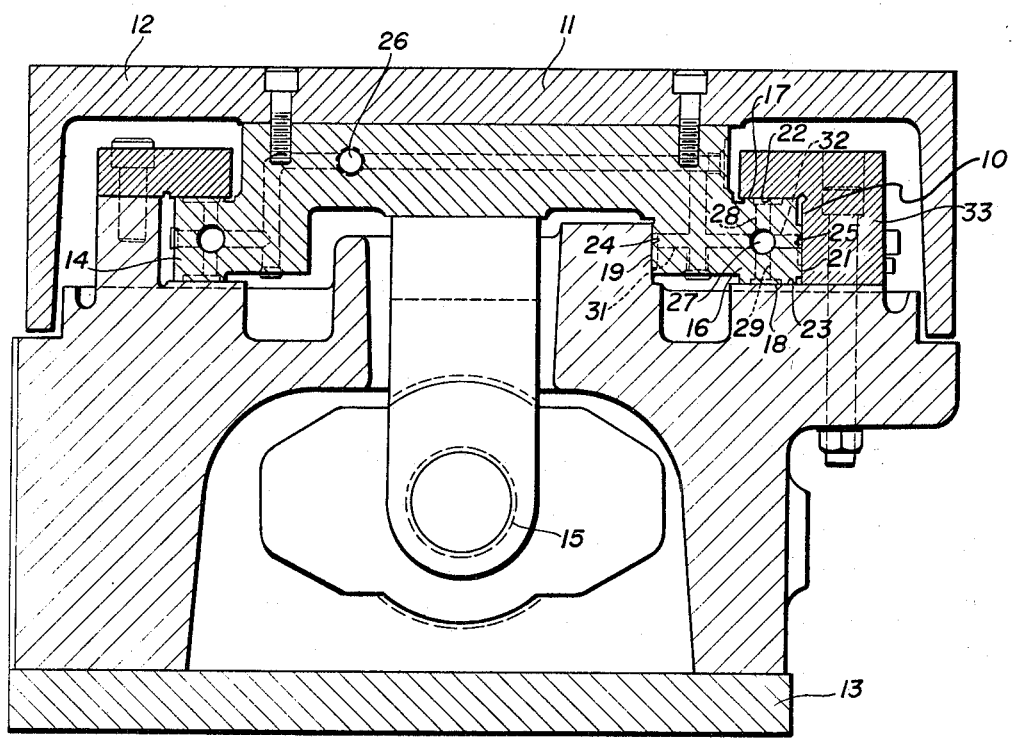
FIG. 1 is a transverse sectional view of a machine bearing incorporating the principles of the present invention.

Referring first to FIG. 1, wherein are best shown the general features of the invention, the machine bearing, indicated generally by the reference numeral 10, is shown as forming part of a machine tool 11 having a table 12 and a base 13. Another similar bearing 14 is incorporated in the machine tool, the two bearings 10 and 14 supporting the table 12 on the base 13 for frictionless relative sliding motion therebetween. A linear actuator, such as a hydraulic cylinder 15, connects the table and base to produce such motion. Attached to the table 12 is a way 16 having four surfaces 17, 18, 19, and 21, these surfaces lying parallel to and slightly spaced from surfaces 22, 23, 24, and 25, respectively, of the base 13. An inlet port 26 is formed in the table for connection to a source of pressure fluid (not shown). This port is connected by passages to a main passage 27 extending longitudinally into the way 16. Extending radially from the passage 27 to the surfaces 17, 18, 19, and 21, respectively, are passages 28, 29, 31, and 32, each passage opening onto a shallow pocket formed on its outlet surface.

Figure 2:
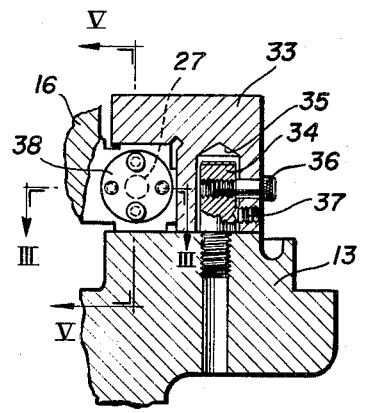
FIG. 2 is an end view of the bearing with portions broken away.
Figure 3:
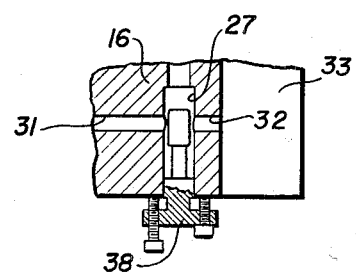
FIG. 3 is a sectional view of the invention taken on the line III—III of FIG. 2.

As is evident in FIG. 2, the base 13 is provided with a separate rail 33 and is formed with an inverted L-shape to provide the two base surfaces 22 and 25. A special post 34 extends upwardly from the lower part of the base into a downwardly-directed bore 35 in the rail, the bore diameter being much greater than that of the post. A bolt 36 and a set screw 37 serve to connect the post and rail while allowing adjustment. A regulating means 38 is bolted to the end face of the way 16 and extends into the main passage 27 to a point well past the passages 31 and 32.

Figure 4:
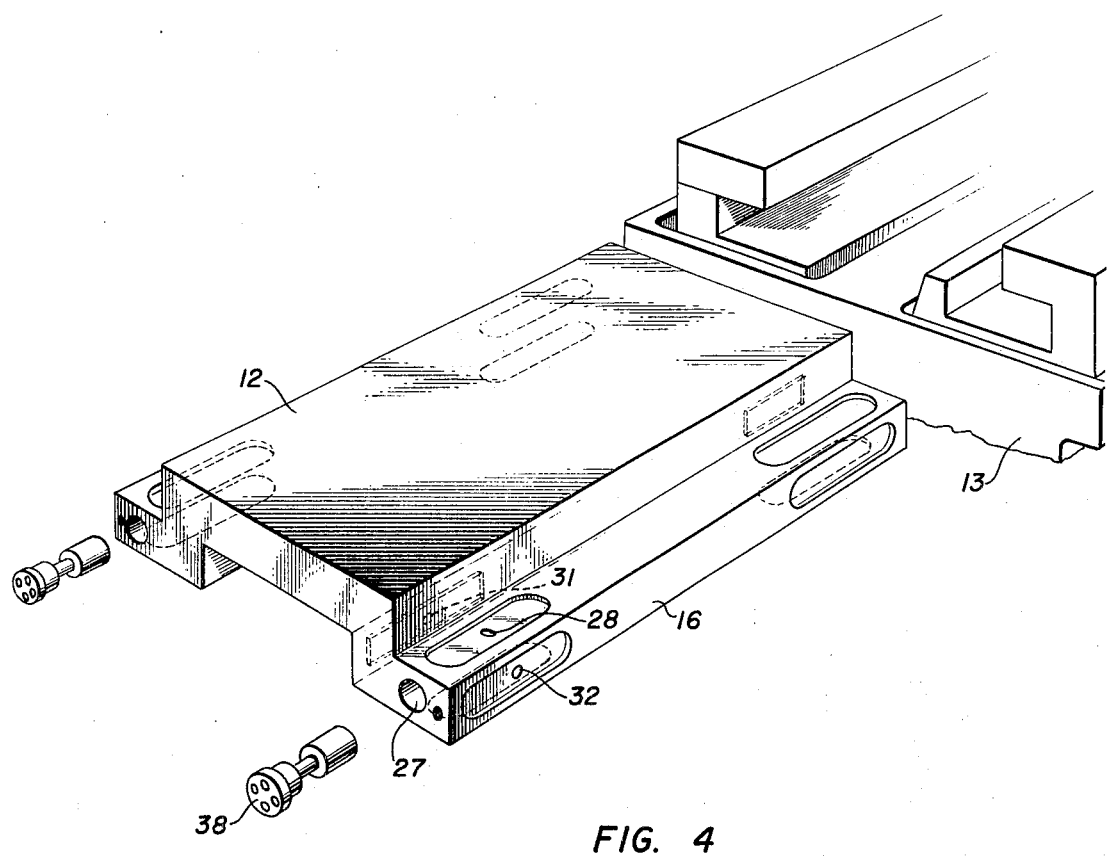
FIG. 4 is a perspective view of the bearing.

The perspective view of FIG. 4 shows the interrelationship of the parts particularly well. The upper part of the table 12 is removed and the location of the hydrostatic pockets is clearly disclosed.

Figure 5:
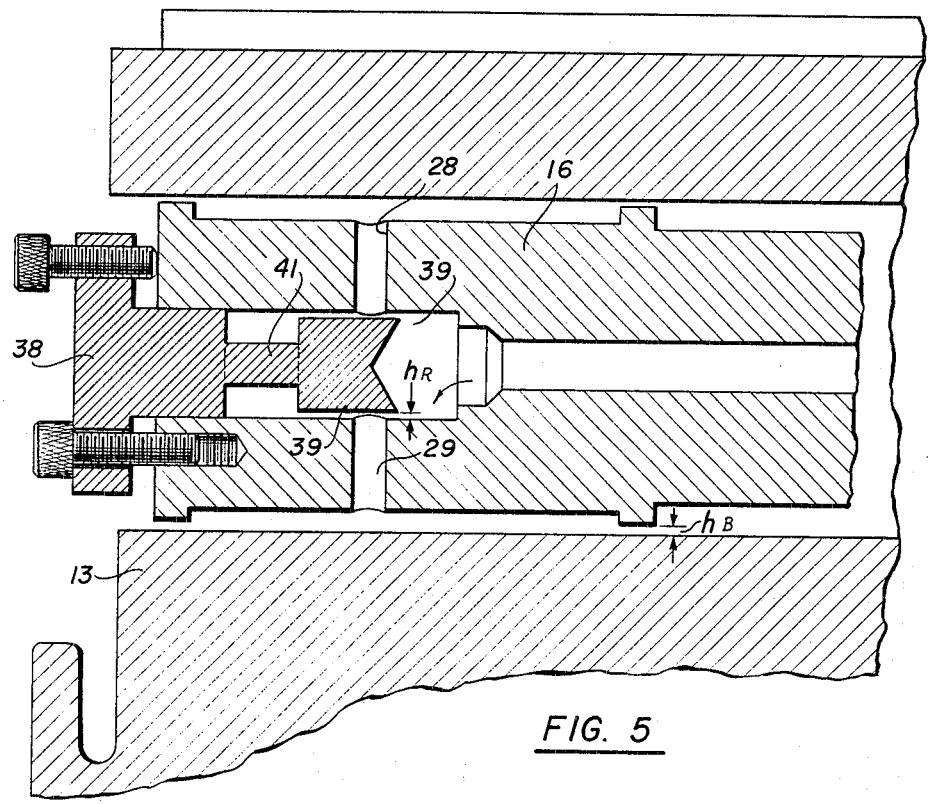
FIG. 5 is a vertical sectional view of the bearing taken on the line V—V of FIG. 2.

FIG. 5 shows the details of the regulating means 38. A flat plate-type restrictor 39 is supported by a reed 41. This reed (in the form of a cantilever spring) allows the clearance of the restrictor to vary in accordance with the pressure in the hydrostatic pockets. When a pocket pressure increases, because of higher load and because of deflection which reduces the pressure around the sill area of the pocket, it will react against the restrictor 39 and bend its supporting spring 41. This movement serves to open the restrictor clearance, $h_R$, which reduces the pressure drop (in a cubic relationship) over this input resistance, thus providing more pressure in the pocket. This increase in pressure in the pocket serves to support the increased load and to increase the flow through the pocket in such a manner that the clearance or sill gap, $h_B$, remains virtually constant or, in any case, changes to a lesser degree than if clearance of the input resistance had remained constant.

With the present bearing design, an endeavor has been made to obtain very great stiffness, which means that the bearing clearance or gap, $h_B$, must remain constant with changing load. This means that, in addition to an increase in pocket pressure to support the additional load, the flow rate, Q, from the pocket through the gap to fluid collection points has to increase proportionately. In other words:

$$Q = L \times (h_B^3 \times P_p / 12\mu \times b$$

where:

Q=fluid flow rate, in.³/sec.
L=sill length
$h_B$=bearing clearance or gap
$P_p$=pocket pressure
$\mu$=dynamic viscosity of the fluid
b=sill width It is clear from this equation that an input restrictor is required through which the flow rate increases linearly with the pocket pressure. It can be shown by mathematical analysis and proven by test that when the spring constant, $K_c$, of the reed 41 is equal to 1.5 $A_R \times P_s / h_R$ (wherein $A_R$ is the effective area against which pressure impinges to deflect restrictor and $P_s$ is the supply pressure), the rigidity of the hydrostatic bearing is infinite with a load change up to 40%. If the spring constant is made larger, the stiffness of the bearing will decrease. With an infinite spring constant for the reed, the rigidity of the bearing will, of course, be that of a capillary (fixed restrictor) bearing. With a weaker reed spring constant, the hydrostatic bearing would have "negative" stiffness. This negative stiffness could be a desirable feature for certain applications and can be used to compensate for mechanical deflection, i.e., elastic deformation of machine elements. For instance, in an internal grinder, a negative stiffness in the hydrostatic bearing of a slide way could be designed to compensate for the deflection of the spindle and the like, such that, when the force between the work and the wheel is reduced, the bearing would back off, thus releasing the various elastic deflections in the system and bringing about a quick "sparkout." The value of negative rigidity (and, thus, the amount of backoff) could be adjusted by moving the compensator axially (changing $b_R/A_R$) or by changing the supply pressure $P_s$. The resistance to flow of a hydrostatic pocket is a function of the sill width divided by the sill length and the third power of the gap; that is to say:

$$R_p = b / L h_B^3$$

To obtain the optimum rigidity, the pressure drop over the input resistance, $R_c$, should be equal to the pressure drop over the output resistance, $R_p$ of the pocket. With a sill width of ¼" and a usual length ratio of $L_p/L_R=8$, the clearance of the compensator restrictor would be twice that of the hydrostatic bearing, which means that the manufacturing tolerances are easy to meet.

Figure 6:
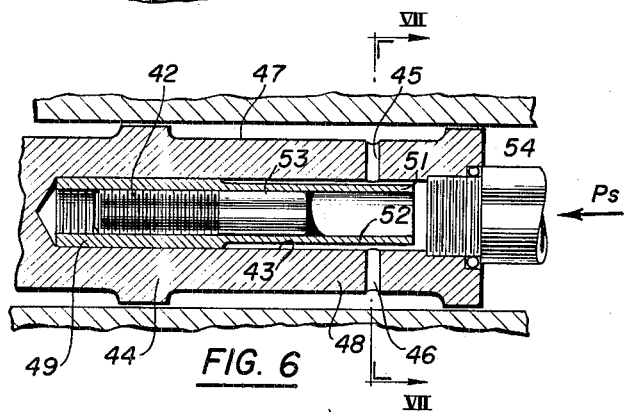
FIG. 6 is a sectional view of a modified form of the bearing.
Figure 7:
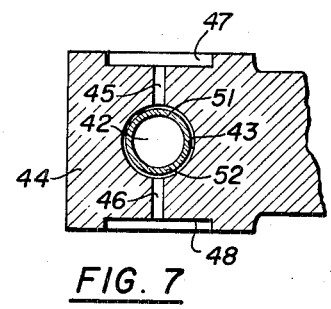
FIG. 7 is a sectional view taken on the line VII—VII of FIG. 6.
Figure 8:
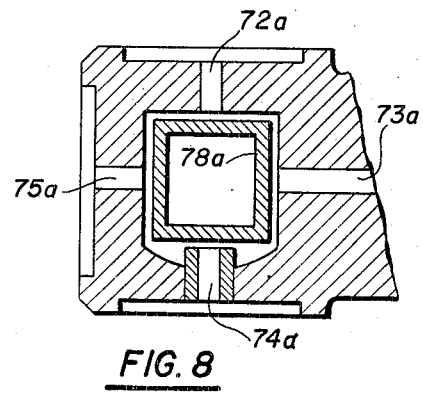
FIG. 8 is a modified form of the restrictor.

FIGS. 6, 7 and 8 show a variation of the load-variable restrictor in which a restrictor 42 is mounted in a main passage 43 in a way 44. Two oppositely-directed passages 45 and 46 lead from the main passage to hydrostatic pockets 47 and 48, respectively. A tube 49 fits slidably in its inner portion in the bore or main passage 43, has its diameter reduced in an outer free portion adjacent the passages 45 and 46, and has its sides cut away in the same vicinity to define two reeds 51 and 52. As is evident in FIG. 7, the reeds are free of one another and move independently toward and away from their respective radial passages. A plug 53 is threaded into an inner portion of the tube 49 and is accessible through an input pressure port 54 to adjust it axially to change the spring constant of the reeds.

FIG. 8 shows a square or flat plate restrictor design which is used in a bearing system. If loaded, it will not effect the input resistances to ports 73a and 75a, but only the resistance values of ports 72a and 74a, as is required due to a load change. This square restrictor head gives better performance but is costlier to manufacture than the round type shown in other views. To circumvent the difficulties of manufacturing the square hole, the port 74a in FIG. 8 is created by inserting a bushing whose end face acts as the restrictor against the square pintle 78a.

Figure 9:
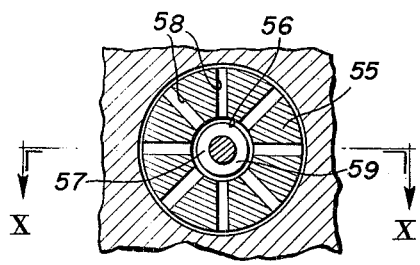
FIG. 9 is a transverse sectional view of another form of the bearing.

In FIGS. 9 and 10 are shown a circular hydrostatic bearing having a pocket extending completely around a spindle 55. A main passage 56 extends axially through the spindle and receives fluid pressure at one end. A restrictor 57 is mounted in the other end. A plurality of radial secondary passages 58 extend from the main passage to the circumferential gap or pocket 59. The restrictor 57 is provided with a cylindrical head 59 having a conical portion 61; by moving the head axially along the main passage, it is possible to adjust the input resistance associated with all the secondary passages 58.

FIGS. 11, 12, 13 show another variation of the invention wherein a way 62 is provided with four surfaces 63, 64, 65, and 66 having hydrostatic pockets 67, 68, 69, and 71, respectively, which are connected by passages 72, 73, 74, and 75 to a main passage 76. The main passage is connected at one end to a fluid pressure source and has a restrictor head 78 mounted on reed 77 in the other end. The head 78 is adjusted axially to obtain the desired pressure drop (as shown in FIG. 12), such that under initial conditions the head 78 is in the center of the bore 76 and the input resistances of the various secondary passages are equal. From this center initial position shown in FIG. 12, the restrictor head 78 will deflect off center in the direction opposing the external load vector as shown in FIGS. 11 and 13. Instead of the hydrostatic slide deflecting in the direction of the load as in a conventional hydrostatic bearing, rather the spring supported restrictor head deflects in the direction of the load thus changing flow and pressure to the hydrostatic bearing pads to minimize or even eliminate any deflection of the slide. The eccentric positioning of the head shown in FIG. 11 tends to increase the input resistance of the secondary passages 72 and 75 and to reduce the input resistance of the passages 73 and 74. The eccentric position shown in FIG. 13 increases greatly the input resistance to the passage 72, decreases greatly the resistance to the passage 74, but maintains equal input resistance to the passages 73 and 75 even though they are lower in value than in the balanced situation shown in FIG. 12.

The machine bearing shown in FIGS. 14 and 15 is self-compensating. A table way 79 has upper and lower flat surfaces 81 and 82 which lie opposite and slightly spaced from similar flat surfaces 83 and 84 formed on a base 85. A main passage 86 enters the end of the way and is connected to a source of fluid pressure. The main passage is connected by a secondary passage 87 to the upper surface 81, while it is connected by a secondary passage 88 to the lower surface 82. Concentric with the opening of the passage 87 onto the surface 81 is a groove 89 whose inner portion is connected by a passage 91 to a large shallow hydrostatic pocket 92 formed on the underside or lower surface 82 of the way. Similarly, a concentric groove 93 is formed around the opening of the secondary passage 88 on the lower surface 82; this groove is operatively connected by a passage 94 to a large shallow hydrostatic pocket 95 formed on the upper surface 81 of the way. The operation of this bearing can be readily understood in view of the above description. First of all, in the case of the prior art hydrostatic bearing, a fixed resistance is connected into the fluid line leading to the hydrostatic pocket; for this purpose, a capillary coil is used of such a size that the amount of fluid flowing through it is equal to the amount of fluid flowing through the outgoing resistance. This outgoing resistance is the resistance represented by the surfaces of the gap surrounding the pocket. Furthermore, the input resistance is usually selected to cause the pressure in the hydrostatic pocket to be equal to roughly one-half the supply pressure. The hydrostatic pocket is, of course, sized so that its effective force (pocket area, $A_p$, multiplied by the pocket pressure, $P_p$, plus the area of land surrounding the pocket multiplied by ½ the pocket pressure) is equal to the effective load, W. As the load, W, is increased, the unit tries to deflect downwardly. When this happens, the outgoing resistance is increased and the flow of fluid through this resistance decreases; the pressure in the pocket then increases. When the effective pocket force is equal to the new total applied load, the system is again balanced. However, the gap (or fluid film thickness) between the loaded element and the supporting element is now less than when supporting the old lesser load. The position of the loaded element has now changed to a lower position. If the loaded element is part of a machine tool, an error has now been introduced.

With the present invention, the incoming resistance is variable in such a way as to maintain the gap (and, therefore, the position of the loaded element) the same, despite changes in load. Now, in the version of the invention shown in FIGS. 14 and 15, the incoming resistance is defined by the clearance between the flat surface of the base 13 (the supporting element) and the annular ring between the passage and the groove; in the illustration, it can be seen that this annular ring is the end of a tube that has been pressed into a bore in the way. The amplitude of this resistance is a function of the face width of this annular ring and it is sized to equal the pressure drop past the outgoing resistance (main pocket plus receiver pocket) and to cause the pocket pressure to be one-half the supply pressure. For this system, a preload force is generated by the upper hydrostatic pocket. The lower pocket must then be sized so that its effective force will equal the total of this preload force and the load. In operation, the fluid flows into the supply pockets through the tubing connection at the input port 86 at the end of the way 79. It then flows across the incoming resistance into a receiver pocket. By means of the inter-drilling (passages 91 and 94), the fluid flows from the receiver pocket to the main pocket (92 or 95) on the opposite side of the way 79. When an additional load is applied (in the direction of the arrow), the way 79 tries to deflect in the direction of the load. In so doing, the incoming resistance on the upper side tends to decrease and the resistance around its main pocket (on the bottom side) tends to increase. This allows more fluid to flow through the upper incoming resistor and less through the sill of the main pocket 92. This causes the pressure in the main pocket 92 to increase faster than if the incoming resistance were fixed. A similar situation exists for the upper main pocket 95, except that its pressure is caused to decrease. This system has many advantages over the prior art, including the following:

(a) Capillary coils and their associated connecting tubing are no longer needed.

(b) No space is needed to house capillary coils.

(c) There is less contained volume of fluid between the incoming resistance and the hydrostatic pocket, which means that the system will have a smaller time constant and will be more responsive to changes in load.

(d) Since the incoming and the outgoing resistances vary with the load, the pocket pressure will change more for a given deflection of the way, which has the effect of causing the system to have greater stiffness.

(e) The stiffness of the way is a function of the preload force and the gap; the stiffness can be increased because the upper main pockets force the way down in the direction of the load. This increases the total preload and keeps the gap constant. therefore, increasing the stiffness.

(f) When used with ways having low mass, the preload effect causes the way to appear to weigh more, thus making the way system to seem stiffer.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine bearing, comprising
   (a) a first element having a pair of oppositely-directed surfaces,
   (b) a second element having a surface lying parallel to and slightly spaced from each of the said pair of surfaces to define a gap associated with each of the said pair of surfaces, a passage opening into each gap, and
   (c) means regulating the flow of pressure fluid to each passage to maintain the thickness of the two gaps at a predetermined value, wherein the two passages are connected to a single main passage leading to a source of pressure fluid and wherein a load-varied restrictor consisting of a movable element is located in the junction, the restrictor consisting of a cantilever-supported reed offering a surface which lies adjacent each passage, the reed being mounted for adjustment longitudinally relative to the passage.

2. A machine bearing as recited in claim 1, wherein the spring constant of the reed selected is equal to 1.5 times the area between the reed and its passages times the supply pressure divided by the height of the gap between the plate and the passage.

References Cited

UNITED STATES PATENTS

| | | | |
|---|---|---|---|
| 3,110,527 | 11/1963 | Fox | 308—122 |
| 3,251,633 | 5/1966 | Mohsin | 308—5 |
| 3,271,086 | 9/1966 | Deffrenne | 308—5 |
| 3,442,560 | 5/1969 | De Gast | 308—5 |

MARTIN P. SCHWADRON, Primary Examiner

L. L. JOHNSON, Assistant Examiner